US005341878A

United States Patent [19]
Osterloh

[11] Patent Number: 5,341,878
[45] Date of Patent: Aug. 30, 1994

[54] FATTY ACID SALTS AS STEAM FOAMING AGENTS

[75] Inventor: William T. Osterloh, Missouri City, Tex.

[73] Assignee: Texaco Inc., White Plains, N.Y.

[21] Appl. No.: 996,741

[22] Filed: Dec. 24, 1992

[51] Int. Cl.$^5$ .................. E21B 43/24; E21B 43/22
[52] U.S. Cl. .................. 166/272; 166/273; 166/274; 166/303; 166/309; 252/8.554
[58] Field of Search ............ 166/272, 303, 309, 273, 166/274; 252/8.554

[56] References Cited

U.S. PATENT DOCUMENTS

| | | | |
|---|---|---|---|
| 3,796,266 | 3/1974 | Carlin et al. | 166/274 X |
| 4,768,592 | 9/1988 | Perkins | 166/294 X |
| 4,844,163 | 7/1989 | Hazlett et al. | 166/300 X |

Primary Examiner—George A. Suchfield
Attorney, Agent, or Firm—James L. Bailey; Kenneth R. Priem; Harold J. Delhommer

[57] ABSTRACT

A steam foam method of recovering hydrocarbons from an underground hydrocarbon formation, which comprises injecting steam through an injection well into the formation, injecting an aqueous solution having a salinity greater than about 1% by weight and a pH of about 8 to about 12, comprising about 0.1% to about 5% by weight of a fatty acid salt having about 10 to about 24 carbon atoms, and injecting steam into the formation to sweep hydrocarbons towards the production well for recovery.

25 Claims, 1 Drawing Sheet

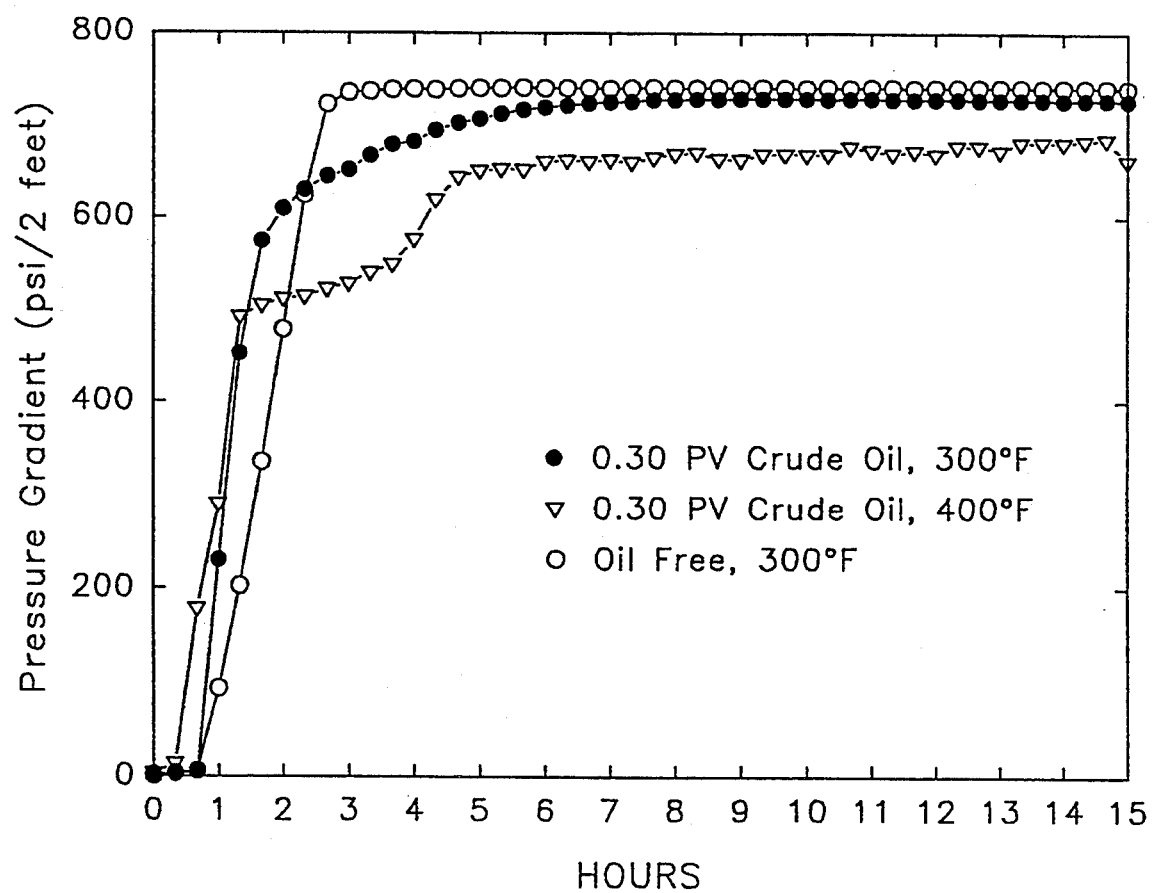

FATTY ACID SALTS AS STEAM FOAMING AGENTS

BACKGROUND OF THE INVENTION

The present invention relates to the use of fatty acid salts to create steam foams in conjunction with steam floods to improve conformance.

When an oil reservoir is subjected to steam injection, steam tends to move up in the formation, whereas condensate and oil tends to move down due to the density difference between the fluids. Gradually, a steam override condition develops, in which the injected steam sweeps the upper portion of the formation but leaves the lower portion untouched. Injected steam will tend to follow the path of least resistance from the injection well to a production well. Thus, areas of high permeability will receive more and more of the injected steam which further raises the permeability of such areas. This phenomenon exists to an even larger degree with low injection rates and thick formations. The steam override problem worsens at greater radial distances from the injection well because steam flux decreases with increasing steam zone radius.

Although residual oil saturation in the steam swept region can be as low as 10% the average residual oil saturation in the formation remains much higher due to poor vertical conformance. Thus it is because of the creation of steam override zones that vertical conformance in steam floods is usually poor.

It has long been the concern of the oil industry to improve the conformance of a steam flood by reducing the permeability of the steam swept zone by various means. The injection of numerous chemicals such as foams, foaming solutions, gelling solutions or plugging or precipitating solutions have been tried. Because of the danger of damaging the reservoir, it is considered important to have a non-permanent means of lowering permeability in the steam override zones. For this reason, certain plugging agents are deemed not acceptable. In order to successfully divert steam and improve vertical conformance, the injected chemical should be (1) stable at high steam temperatures of about 300° to about 600° F., (2) effective in reducing permeability in steam swept zones, (3) non-damaging to the oil reservoir and (4) economical.

The literature is replete with references to various foaming agents which are employed to lower permeability in steam swept zones. The vast majority of foaming agents in the prior art require the injection of a non-condensable gas to generate the foam in conjunction with the injection of steam and the foaming agent. Copending U.S. patent application Ser. No. 07/896,710, filed Jun. 10, 1992, now U.S. Pat. No. 5,279,367, discloses the use of fatty acids having about 12 to 20 carbon atoms as additives to surfactant foaming solutions used in steam or carbon dioxide floods where the ratio of fatty acid to surfactant in the foaming solution is between about 1:4 and 3:2.

SUMMARY OF THE INVENTION

The invention is a method of recovering hydrocarbons from an underground hydrocarbon formation penetrated by at least one injection well and at least one production well, which comprises injecting steam through an injection well into the formation, and injecting an aqueous solution having a salinity greater than about 1% by weight and a pH of about 8 to about 12, comprising about 0.1% to about 5% by weight of a fatty acid salt having about 10 to about 24 carbon atoms. The steam is injected into the formation to sweep hydrocarbons towards the production well for recovery.

The injection may also be practiced in a cyclic embodiment involving injection and production through the same well.

BRIEF DESCRIPTION OF THE DRAWINGS

FIG. 1 is a graph illustrating the pressure gradient responses over time of a steam foam created in a laboratory core flood with a tall oil acid salt.

DETAILED DESCRIPTION

The invention steam foams are highly effective in reducing the permeability of steam flood swept zones. It involves the injection of about 0.1% to about 5%, preferably about 0.3% to about 1% by weight, of a fatty acid salt in aqueous solution, said fatty acid salt having about 10 to about 24 carbon atoms and salinity greater than about 1% by weight.

In order to maintain the fatty acid salts in solution, the invention method requires that the pH of the aqueous solution be between about 8 and about 12. Outside this range, the fatty acid salts are not sufficiently water soluble. Whether the fatty acid salts are injected into the formations or solvated in the aqueous phase of injected steam or in a separate aqueous solution, the pH must be controlled to permit the fatty acids salts to be carried to formation regions of high permeability such as steam override zones instead of dropping out of solution, and perhaps plugging the near wellbore area. The creation of a steam foam in the high permeability areas of the reservoir decreases permeability sufficiently to redirect subsequently injected steam to other formation regions, improving conformance.

The present invention requires the use of fatty acid salts having between about 10 and about 24 carbon atoms. Although, the fatty acids are preferably unsaturated, they may be saturated or a mixture of the two. The saturated fatty acids have handling difficulties in that they are solids at room temperature. Solutions must be kept hot to prevent solidification causing the saturated fatty acid to fall out of solution.

Although numerous fatty acid salts may be used in the invention method, the preferred compound or mixture of compounds comprises tall oil acid salts. Tall oil acid is a renewable resource, derived from tall oil, a by-product of the alkaline pulping of pine trees. Tall oil acid is composed mainly of oleic and linoleic acids. Because it is a pulping by-product, tall oil acid carries with it an extremely low cost, especially when compared to steam foam surfactants of the prior art. The unsaturated acid compounds are liquid at ambient temperatures, which makes them easy to transport and handle.

Dimers and trimers of the fatty acid salts may be used but have been discovered to be less effective than the fatty acid monomers. The creation of a dimer fatty acid causes a loss of polarity of the molecule. Both sides have a hydrophobic end and a hydrophilic end. It is believed this is the reason why some loss of performance has been noted in invention method tests employing dimers and trimers.

Chain lengths shorter than 10 carbon atoms are known to be less interfacially active. Thus, it is believed that foaming results would not be as good as with those fatty acid salts within the invention carbon range of about 10 to about 24. The fatty acids are made water soluble by neutralization with any number of organic or inorganic bases, such as metal hydroxides, metal oxides, metal carbonates or bicarbonates, or amines.

Since it is necessary to maintain the aqueous solution in a pH range of about 8 to about 12 in order for the fatty acid salt to remain in solution, and since formation water pH for most underground hydrocarbon formations is about 7, it will usually be desirable to add a basic buffer to the fatty acid salt solution to help maintain the pH in the desired 8 to 12 pH range, preferably about 0.1% to about 2% by weight. A preferred buffer is sodium sesquicarbonate, although other buffers such as sodium carbonate, sodium bicarbonate/sodium hydroxide, and disodium hydrogen phosphate/sodium hydroxide may be used.

The amount of basic buffer added may vary considerably due to several factors. Sufficient buffer must be added to maintain the aqueous solution pH in the 8 to 12 range. If the location desired to set up the steam foam is a considerable distance into the formation from the wellbore, it may be necessary to add sufficient basic buffer to have a higher than needed pH in the near wellbore area so that dilution with formation and steam flood waters is insufficient to lower pH below 8. But since a high salinity may cause the fatty acid salts to precipitate from solution, a careful balance must be struck between the addition of a basic buffer and a maximum salinity which may cause precipitation.

The salinity of the solution carrying the fatty acid salts must also be controlled within a range of about 1% to about 5% salt by weight, including the salt added by a basic buffer. This is a very rough range dependent upon several factors such as the type of fatty acid salt, temperature and pH. At steam flood temperatures (usually 150° C. plus) and salinity (usually below 0.1% by weight), salinity must be added to produce effective steam foams, even if the solution is in the desired pH range. Common salts which may be added are sodium chloride, potassium chloride, and lithium chloride, A preferred range of salinity for 0.5% by weight fatty acid salts appears to be about 1% to 3% by weight for temperatures of about 150° to 200° C. As temperature increases in the steam flood, higher salinity is needed for an effective foam. It is believed, although not known, that the fatty acid salts become more water soluble as the temperature increases, and require a greater solution salinity to effectively make the fatty acid salts more hydrophobic. If a 0.5% buffer is added, then the preferred range of added salinity should be about 0.5% to about 2.5% by weight.

High salinities may cause the fatty acid salt to precipitate from solution. At 200° C. our experiments indicate that 0.5% of tall oil acid salt will remain in solution and produce an effective foam at a pH of 10 in a salinity range of about 1.5% to about 4.5%. However, a difference in pH, fatty acid salt, and temperature may change that range.

In light of the above discussion, it should be apparent that depending upon the individual conditions such as temperature, salinity, buffer, and the particular type of fatty acid salt employed, the optimum ratios of these various components to each other may vary significantly. Once the type and concentration of fatty acid salt is established, various tests should be run to further optimize the other preferred components within their broad ranges to determine what blend will give the fastest foam response under the particular application conditions.

U.S. Pat. No. 5,027,898, incorporated herein by reference, discusses numerous variations known in the art of using steam foaming agents. These variations include injection of the foaming agent (fatty acid salt and additional components, if desired) with the initial injection of steam, injection prior to steam breakthrough at a production well, injection after steam breakthrough at a production well, injection into a steam override zone, and others. The inventor is unaware of any reason why the invention method would inhibit the use of any of the variations disclosed or why these variations would inhibit the use of the invention method.

The invention may also be practiced in a cyclic embodiment wherein injection and production is performed through the same well. The use of the invention method to increase conformance in cyclic steam injection comprises injecting steam through an injection/production well, injecting an aqueous solution through the injection/production well having a salinity greater than about 1%, a pH of about 8 to about 12, and about 0.1% to about 5%, preferably about 0.3% to about 1% by weight, of a fatty acid salt having about 10 to about 24 carbon atoms, injecting steam through the injection/production well, and producing hydrocarbons and other fluids through the injection/production well. It is usually desirable to allow the injected steam to soak in the formation for about one to about 14 days or longer prior to producing hydrocarbons and other fluids, as is commonly practiced in the art.

The following examples will further illustrate the novel fatty acid salt method of creating foams in steam floods. These examples are given by way of illustration and not as limitations on the scope of the invention. Thus, it should be understood that the composition and concentration of components may be varied to achieve similar results within the scope of the invention.

EXAMPLES 1-5

FIG. 1 illustrates the pressure gradient responses over time obtained when 0.5% by weight tall oil acid sodium salt solutions in Kern River softened water with a pH of 10 were injected with nitrogen gas into sandpacks along with added sodium chloride and sodium sesquicarbonate as a basic buffer. The nitrogen gas was injected at 145 sccm (Ex. 2 at 280 sccm). Liquid injectants (tall oil salt/salts/water) were injected at a rate of 0.8 ml/min in the 2 foot by 1.5 inch, 6 Darcy linear sandpack. The Example 3 sandpack contained no oil, about 0.55 pore volumes of Kern River softened water and about 0.45 pore volumes of nitrogen. Injection temperatures and pressures were varied for Examples 1-3 as noted in Table 1. Kern River softened water is relatively fresh, containing about 800 ppm Total Dissolved Solids (TDS) which includes about 320 ppm sodium chloride, about 320 ppm sodium bicarbonate, and about 160 ppm sodium sulfate.

TABLE 1

| Example | Oil Satn. (PV) | Temp. (°C.) | Core Back Press. (psig) | Liquid Rate (cc/min) | Nitrogen Rate (sccm) | Na sesqui-carbonate (wt %) | NaCl (wt %) |
| --- | --- | --- | --- | --- | --- | --- | --- |
| 1 | 0.30 | 150 | 200 | 0.8 | 145 | 0.5 | 1.0 |
| 2 | 0.30 | 204 | 260 | 0.8 | 280 | 0.5 | 1.5 |
| 3 | NONE | 150 | 200 | 0.8 | 145 | 0.5 | 1.0 |

For all three examples, nitrogen and Kern River softened water were injected for one hour to establish a gas saturation in the core prior to the start of foam injection. A rapid pressure response was observed in all three examples, indicating that (1) a pressure resisting foam was formed, and (2) the ability of the tall oil acid salt to form a foam was not affected by the presence of the crude oil. This contrasts to a number of foam making surfactants, including some sold commercially for steam foams, whose ability to foam is diminished by the presence of crude oil. A large steady state pressure was maintained for a lengthy time. This indicates that the strong foam generated was also stable, a needed characteristic for steam foam use. The tall oil acid salt was also effective in forming a strong foam at both low and high steam flood temperatures.

In Example 4, the conditions of Example 1 were duplicated except that the temperature was raised to a more common steamflood temperature of 204° C. An ineffective foam was generated because of the low 1.5% salinity. Similar conditions, except for 2% salinity, in Example 2 yielded a strong, stable steam foam.

In an attempt to find an upper limit for salinity with 0.5% of the tall oil salt, Example 5 duplicated the Example 2 (204° C.) run, except with salinity of 4% including 0.5% by weight of carbonate from the buffer. Although a strong, stable foam was generated, it is believed that the 4% salinity is near the maximum limit for these particular conditions.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:
   injecting steam through an injection well into the formation;
   injecting through the injection well into the formation an aqueous solution having a salinity greater than about 1% and a pH of about 8 to about 12 comprising about 0.1% to about 5% by weight of a fatty acid salt having about 10 to about 24 carbon atoms; and
   injecting steam through the injection well into the formation to sweep hydrocarbons towards a production well for recovery.

2. The method of claim 1, wherein the fatty acid salt of said aqueous solution is solvated in the aqueous phase of injected steam.

3. The method of claim 1, wherein the fatty acid salt is an unsaturated fatty acid salt.

4. The method of claim 1, wherein the fatty acid salt is a saturated fatty acid salt.

5. The method of claim 1, wherein the fatty acid salt is a mixture of saturated and unsaturated fatty acid salts.

6. The method of claim 1, wherein the fatty acid salt is a tall oil acid salt.

7. The method of claim 6, wherein the fatty acid salt is an oleic acid salt.

8. The method of claim 6, wherein the fatty acid salt is a linoleic acid salt.

9. The method of claim 1, wherein the aqueous solution further comprises a basic buffer to help maintain the pH of the solution between about 8 and about 12.

10. The method of claim 9, wherein the basic buffer is sodium sesquicarbonate, sodium carbonate, or sodium bicarbonate/sodium hydroxide, or disodium hydrogen phosphate/sodium hydroxide.

11. The method of claim 1, wherein the aqueous solution comprises about 1% to about 3% of an inorganic salt.

12. The method of claim 11, wherein the inorganic salt is sodium chloride, potassium chloride, or lithium chloride.

13. The method of claim 1, wherein the fatty acid salt is injected into the formation with the initial injection of steam.

14. The method of claim 1, wherein the fatty acid salt is injected into the formation prior to steam breakthrough at a production well.

15. The method of claim 1, wherein the fatty acid salt is injected into the formation after steam breakthrough at a production well.

16. The method of claim 1, wherein the aqueous solution is injected into a steam override zone.

17. The method of claim 1, wherein the aqueous solution comprises about 0.3% to about 1% of the fatty acid salt.

18. A method of recovering hydrocarbons from an underground hydrocarbon formation penetrated by at least one injection well and at least one production well, which comprises:
    injecting steam through an injection well into the formation;
    injecting an aqueous solution having a pH of about 8 to about 12 through the injection well into the formation, said aqueous solution comprising about 0.3% to about 1% by weight of a tall oil acid salt, sodium sesquicarbonate as a basic buffer to maintain the pH between about 8 to about 12, and about 0.5% to about 2.5% by weight of inorganic salt; and
    injecting steam through the injection well into the formation to sweep hydrocarbons towards a production well for recovery.

19. A method of recovering hydrocarbons from an underground hydrocarbon formation penetrated by at least one well which comprises:
    injecting steam through an injection/production well into the formation:
    injecting through the injection/production well into the formation an aqueous solution having a salinity greater than about 1% and a pH of about 8 to about 12 comprising about 0.1% to about 5% by weight of a fatty acid salt having about 10 to about 24 carbon atoms;

injecting steam through the injection/production well into the formation;

producing hydrocarbons and other fluids through the injection/production well.

20. The method of claim 19, wherein the injected steam is allowed to soak in the formation for about one to about fourteen days prior to producing hydrocarbons and other fluids.

21. The method of claim 19, wherein the fatty acid salt is a tall oil acid salt.

22. The method of claim 19, wherein the aqueous solution further comprises a basic buffer to help maintain the pH of the solution between about 8 and about 12.

23. The method of claim 19, wherein the aqueous solution comprises about 1% to about 3% of an inorganic salt.

24. The method of claim 19, wherein the aqueous solution comprises about 0.3% to about 1% of the fatty acid salt.

25. A method of recovering hydrocarbons from an underground hydrocarbon formation penetrated by at least one well, which comprises:

injecting steam through an injection/production well into the formation;

injecting an aqueous solution having a pH of about 8 to about 12 through the injection/production well into the formation, said aqueous solution comprising about 0.3% to about 1% by weight of a tall oil acid salt, sodium sesquicarbonate as a basic buffer to maintain the pH between about 8 and about 12, and about 0.5% to about 2.5% by weight of inorganic salt;

injecting steam through the injection/production well into the formation;

allowing the injected steam to soak in the formation for about one to about fourteen days; and producing hydrocarbons and other fluids through the injection/production well.

* * * * *